United States Patent [19]

Dolby

[11] Patent Number: 5,606,637
[45] Date of Patent: Feb. 25, 1997

[54] DECORATIVE FIBER OPTIC LIGHT FIXTURE AND METHODS OF MAKING SAME

[76] Inventor: Timothy S. Dolby, P.O. Box 991, Salida, Colo. 81201

[21] Appl. No.: 505,680

[22] Filed: Jul. 21, 1995

[51] Int. Cl.$^6$ .................. G02B 6/04; F21V 7/04
[52] U.S. Cl. .................. 385/115; 362/32; 385/901
[58] Field of Search .................. 385/115–120, 901, 385/88, 89, 147; 362/32

[56] References Cited

U.S. PATENT DOCUMENTS

| | | | |
|---|---|---|---|
| D. 264,632 | 5/1982 | Tiffany | D26/27 |
| 3,536,908 | 10/1970 | Oster | 240/10.1 |
| 3,624,385 | 11/1971 | Wall | 362/32 |
| 3,721,815 | 3/1973 | Wall | 362/32 |
| 3,727,043 | 4/1973 | Wall | 362/32 |
| 3,727,044 | 4/1973 | Monroy | 362/32 |
| 4,025,779 | 5/1977 | Ahroni | 240/10 L |
| 4,034,215 | 7/1977 | Hashimoto | 362/32 |
| 4,923,268 | 5/1990 | Xu | 385/50 |
| 4,958,263 | 9/1990 | Davenport et al. | 362/32 |
| 5,109,463 | 4/1992 | Lee | 385/123 |
| 5,208,541 | 5/1993 | Yerkovich et al. | 324/395 |
| 5,386,489 | 1/1995 | Stokes | 385/100 |

*Primary Examiner*—Brian Healy
*Assistant Examiner*—Hemung Sunghavi
*Attorney, Agent, or Firm*—Richard L. Miller, P.E.

[57] ABSTRACT

A spray of optic fibers is secured in one end of a heat shrunk tubing, and the bulb of a decorative device is secured in the other end of the heat shrunk tubing. The spray of optic fibers and the bulb are secured within the heat shrunk tubing during the heat shrinking process so as to form a light fixture assembly.

5 Claims, 1 Drawing Sheet

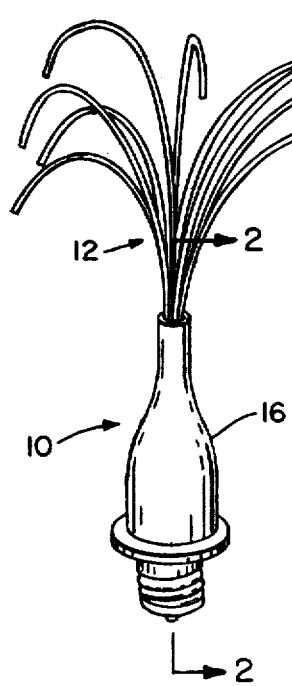
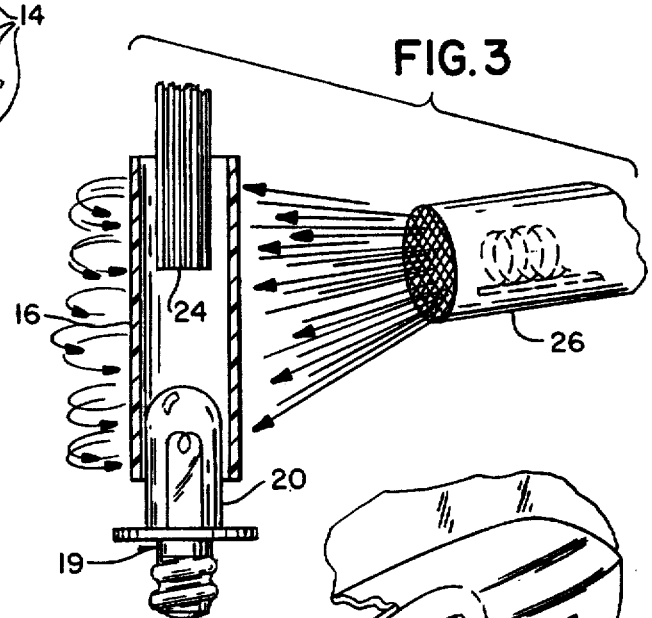
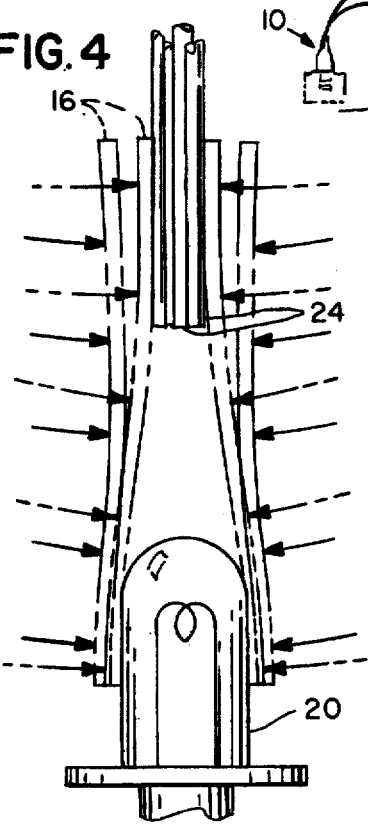
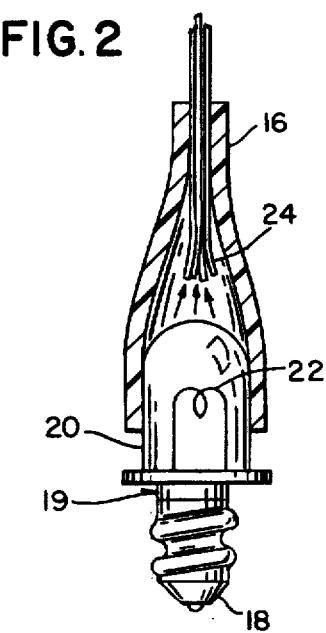
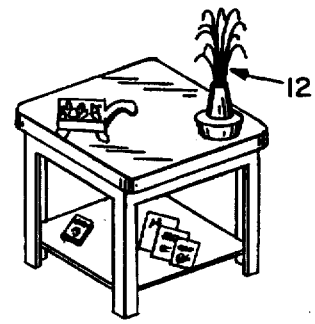

DECORATIVE FIBER OPTIC LIGHT FIXTURE AND METHODS OF MAKING SAME

BACKGROUND OF THE INVENTION

This invention relates to fiber optic decorative devices and, particularly, to such a device in which a spray of optic fibers is secured in one end of a heat shrunk tubing, and the light bulb of the decorative device is secured in the other end of the heat shrunk tubing.

DESCRIPTION OF RELATED ART

Optic fibers are well known in the decorative arts for transmitting light over flexible paths. Such fibers may be made of coated glass, but, for decorative devices, are more commonly constructed from finely drawn, thermoplastic, organic polymer materials. In the latter instance, a core of a first thermoplastic is jacketed with a second thermoplastic having an index of refraction less than the first. Suitable materials and the methods for producing the optic fibers therefrom are well known in the art.

A fiber optic lighting system is described in U.S. Pat. No. 3,536,908 to Oster. The invention disclosed therein provides a lighting system comprising a trunk of fiber optic bundles of different lengths. A source of light is provided adjacent the base of the trunk and reflectors are mounted on the end portions of the branched bundles.

An optic fiber decorative device is described in U.S. Pat. No. 4,025,779 to Ahroni. The invention disclosed therein provides a spray of optic fibers plugged into the top of a housing having an electric light assembly. The electric light assembly comprises an electric light bulb having a reflector directing the light toward that portion of the spray of optic fibers which is plugged into the top of the housing.

A fiber optic light display is described in U.S. Design Pat. No. 264,632 to Tiffany. The invention disclosed therein provides a fiber optic light display wherein the optic fibers are arranged in a decorative manner.

A fiber optic lamp is described in U.S. Pat. No. 5,109,463 to Lee. The invention disclosed therein provides a lamp having a housing which holds optic fibers. The optic fibers have a luminescent material embedded in them. The lamp further comprises an exciting device where energy given off by the exciting device causes the luminescent material of the fibers to emit optical energy.

None of these patents disclose the use of heat shrink tubing to hold a bundle of optic fibers at the desired distance from a light source. None of these patents disclose the use of a heat shrink tubing to create a pleasing appearance along with functional utility in a decorative fiber optic light fixture. Each of these devices is characterized by relative difficulty of manufacture.

SUMMARY OF INVENTION, OBJECTS AND ADVANTAGES

The present invention aims to provide an improved decorative light fixture of the type having a bundle of optic fibers with their light-receiving ends held together as a unit and their light-emitting end portions flared outwardly. The present invention provides for a simple method of manufacture requiring only a few simple steps: The light receiving end of a bundle of fiber optic strands is inserted in the first end of an elongated section of heat-shrink tubing and the glass envelope of a light bulb is partially inserted into the other end of the heat-shrink tubing. The light bulb is then turned on, and heat from a heat source is directed at the exterior surface of the heat shrink tubing. The heat from the light bulb along with the heat from the heat source causes the heat shrink tubing to shrink onto both the bundle of fiber optic strands and onto the glass envelope of the light bulb, thus securing the bundle of fiber optic fibers in the first end of the tube and securing the glass envelope of the light bulb in the other end of the heat shrink tubing.

The resultant invention is a decorative fiber optic light fixture with the fiber optic strands projecting from the top of the fixture flaring outward into an attractive spray pattern. When the light bulb is turned on, the light from the bulb enters the light receiving ends of the optic fibers in the bundle of optic fibers and is transmitted by internal reflection or refraction (depending upon the type of optic fibers used) in the optic fibers toward the other end of the bundle which flares outwardly. Thus the decorative fiber optic light fixture comprises a heat shrink tubing having a first end and a second end, a bundle of fiber optic strands having a first end and a second end, the first end of said bundle of fiber optic strands being partially inserted in the first end of the heat shrink tubing, the second end of said bundle of fiber optic strands flaring out into a spray formation, and a light bulb inserted in the second end of the heat shrink tubing, whereby when the light bulb is illuminated, light from the light bulb illuminates the first end of the bundle of fiber optic strands, and is transmitted along the bundle in the direction of the second end of the fiber optic bundle.

It is therefore an object of the present invention to provide a decorative optic light fixture with a simple method of manufacture.

A second object of the instant invention is to provide a decorative light fixture having the optic fiber bundle held in a desired spatial relationship with respect to a light source by heat shrink tubing.

A third object of the instant invention is to provide a method of making such a decorative fiber optic light fixture.

Thus the instant invention is an ornamental fiber optic light fixture which is characterized by simplicity and economy of manufacture.

Further scope of applicability of the present invention will become apparent from the detailed description given hereafter. However, it should be understood that the drawings and the detailed description, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a diagrammatic perspective view of the instant invention.

FIG. 2 is a cross sectional view taken on line 2—2 of FIG. 1.

FIG. 3 is a diagrammatic exploded cross sectional view similar to FIG. 2 illustrating the assembly of some of the components of the instant invention.

FIG. 4 is a diagrammatic cross sectional view illustrating the shrink tubing contracting onto a bundle of optic fibers and onto the glass envelope of a light bulb.

FIG. 5 is a diagrammatic perspective view with parts broken away illustrating the instant invention being used to illuminate a dash board.

FIG. 6 is a diagrammatic perspective view illustrating the instant invention being utilized typically as a decorative table light.

DESCRIPTION OF PREFERRED EMBODIMENT

The decorative fiber optic light fixture is generally shown in FIG. 1 as 10. Referring to the figures, it is seen that a spray of optic fibers (generally shown as 12 in FIG. 1) is gathered in a bundle within one end of a section of heat shrink tubing 16 with the bundled base ends exposed to receive light passing through the glass envelope 20 of an electric bulb (having a filament 22), shown generally in FIG. 2 as 19. The glass envelope 20 of the electric bulb 19 is partially enclosed within the other end of the heat shrink tubing 16. The bundled base ends of the spray of optic fibers 12 receive light from the electric bulb 19 and the light is transmitted by reflection or refraction to the tip ends 14 of the fiber optic spray thus emitting light at the tip ends 14.

FIG. 2 shows the glass envelope 20 of the light bulb 19 partially enclosed in one end of the heat shrink tubing 16 and the base ends 24 of the fiber optic spray 12 enclosed in the other end of the heat shrink tubing 16.

FIG. 3 illustrates the method by which the glass envelope 20 of the light bulb 19 and the base ends 24 are enclosed within a heat shrink tubing 16. A heat source 26 directed at the exterior surface of the heat shrink tubing 16 in conjunction with the light bulb 19 being turned on provides sufficient heat to cause the heat shrink tubing 16 to shrink onto the base ends 24 of the fiber optic spray and also onto the glass envelope 20 of the light bulb 19.

FIG. 4 shows the heat shrink tubing 16 in the process of shrinking onto both the base ends 24 of the fiber optic spray and the glass envelope 20 of the light bulb 19.

FIG. 5 shows the instant invention being utilized to illuminate various dials and gauges on the instrument panel of the dashboard of a vehicle.

The preferred method of making the preferred embodiment of the instant invention can be described referring to FIG. 3. The base ends 24 of an optic fiber bundle are inserted in one end of an elongated piece of heat shrink tubing 16, and the glass envelope 20 of an electric light bulb 19 is partially inserted in the other end of the heat shrink tubing 16. The light bulb is turned on, and a heat source 26 is used to direct heat onto the exterior surface of the heat shrink tubing 16. The heat from the light bulb 19 and the heat from the heat source 26 cause the heat shrink tubing 16 to contract onto both the base ends 24 of the optic fiber bundle and the glass envelope 20 of the light bulb 19, with sufficient tightness to cause all of the components to form single fixture assembly 10. FIG. 4 shows the heat shrink tubing 16 contracting onto both the base or light receiving end of the optic fiber bundle and the glass envelope of a light bulb.

From the foregoing, it will be seen that what has been provided is a novel and decorative optic fiber optic light fixture with an extremely simple method of manufacture.

CONCLUSION, RAMIFICATIONS, AND SCOPE OF INVENTION

Thus the reader will see that the instant invention supplies a long felt need for an economical and easy to manufacture decorative fiber optic light fixture. There are many variations of this decorative fiber optic light fixture which can be made without departing from the inventive concepts expressed herein. Accordingly, the scope of this invention should be determined not by the embodiments described herein, but by the appended claims and their legal equivalents.

What is claimed is:

1. A fiber optic light fixture, comprising:
   a) a substantially conically-shaped tube having a cylindrically-shaped portion with a diameter and an open wide end, and a tapered portion having a tapered shape and being integral with, and extending smoothly and coaxially from, said cylindrically-shaped portion of said substantially conically-shaped tube; said tapered portion of said substantially conically-shaped tube having an open narrow end being displaced from, and narrower than, said open wide end of said cylindrically-shaped portion of said substantially conically-shaped tube;
   b) a bundle of fiber optic strands having a first end passing through said open narrow end of said tapered portion of said substantially conically-shaped tube and entering coaxially into, and being in optical communication with, said tapered portion of said substantially conically-shaped tube; said at least one fiber optic strand further having a free second end displaced from said first end of said bundle of fiber optic strands;
   c) a light bulb passing through said open wide end of said cylindrically-shaped portion of said substantially conically-shaped tube and entering coaxially into, and being in optical communication with, said cylindrically-shaped portion of said substantially conically-shaped tube, so that when said light bulb is illuminated light therefrom passes through said cylindrically shaped portion of said substantially conically-shaped tube into said tapered portion of said substantially conically-shaped tube where the light is concentrated without dispersion as a result of said tapered shape of said tapered portion of said substantially conically-shaped tube and directed to said bundle of fiber optic strands where the light is transmitted therealong to said free second end of said at least one fiber optic strand; said light bulb having a substantially cylindrically-shaped envelope with an outer diameter equal to said inner diameter of said cylindrically-shaped portion of said substantially conically-shaped tube, so that said light bulb can be easily slid out of, and slide into, said cylindrically-shaped portion of said substantially conically-shaped tube when replacement thereof is necessary without damage to said substantially cylindrically-shaped envelope of said light bulb; and
   wherein said substantially conically-shaped tube is a heat shrink tubing subsequently to being shrunk to conform to said first end of said bundle of fiber optic strands and said substantially cylindrical-shaped envelope of said light bulb.

2. The fixture as defined in claim 1, wherein said free second ends of said bundle of fiber optic strands flare outwardly into a spray formation.

3. A centralized dashboard illumination device, comprising:
   a) a dashboard having at least one item requiring illumination;
   b) a bundle of fiber optic strands having a first end and a second end; said first end of each strand of said bundle of fiber optic strands being connected to, and in optical communication with, a respective item of said at least one item in said dashboard;

c) a substantially conically-shaped tube having a cylindrically-shaped portion with an inner diameter and an open wide end, and a tapered portion having a tapered shape and being integral with, and extending smoothly and coaxially from, said cylindrically-shaped portion of said substantially conically-shaped tube; said tapered portion of said substantially conically-shaped tube having an open narrow end being displaced from, and narrower than, said open wide end of said cylindrically-shaped portion of said substantially conically-shaped tube; said open narrow end of said tapered portion of said substantially conically-shaped tube receiving, and being in optical communication with, said second end of said bundle of fiber optic strands;

d) a single centralized light bulb passing through said open wide end of said cylindrically-shaped portion of said substantially conically-shaped tube and entering coaxially into, and being in optical communication with, said cylindrically-shaped portion of said substantially conically-shaped tube, so that when said single centralized light bulb is illuminated light therefrom passes through said cylindrically-shaped portion of said substantially conically-shaped tube into said tapered portion of said substantially conically-shaped tube where the light is concentrated without dispersion as a result of said tapered shape of said tapered portion of said substantially conically-shaped tube and directed to said at bundle of fiber optic strands where the light is transmitted therealong to, and illuminating, said at least one item in said dashboard so as to allow all said at least one item in said dashboard to be illuminated by said single centralized light bulb; said single centralized light bulb having a substantially cylindrically-shaped envelope with an outer diameter equal to said inner diameter of said cylindrically-shaped portion of said substantially conically-shaped tube, so that said single centralized light bulb can be easily slid out of, and slide into, said cylindrically-shaped portion of said substantially conically-shaped tube when replacement thereof is necessary without damage to said substantially cylindrically-shaped envelope of said single centralized light bulb; said single centralized light bulb being positioned in an easily accessible portion of said dashboard, so that said single centralized light bulb can be easily accessed without having to at least one of crawl under and disassemble said dashboard when replacement thereof is necessary; and wherein said substantially conically-shaped tube is a heat shrink tubing subsequently to being shrunk to conform to said first end of said bundle of fiber optic strands and said substantially cylindrical-shaped envelope of said light bulb.

4. A method of making a fiber optic light fixture, comprising the steps of:

a) inserting a first end of a bundle of fiber optic strands of said fiber optic light fixture coaxially through a first open end of a first portion of a heat shrink tube of said fiber optic light fixture wherein said heat shrink tube has an exterior surface;

b) inserting a substantially cylindrically-shaped envelope of a light bulb coaxially through a second end of a second portion of said heat shrink tube wherein said substantially cylindrically-shaped envelope of said light bulb has an outer diameter; and c) applying heat only from an external heat source, so that said light bulb does not have to be inconveniently connected to a power source to generate heat during said method, onto said exterior surface of said heat shrink tube and causing said first portion of said heat shrink tube to contract onto, and be in optical communication with, said first end of said at least one optic fiber and form a tapered portion with a tapered shape, so that when said light bulb is illuminated light therefrom is concentrated without dispersion as a result of said tapered shape of said tapered portion of said substantially conically-shaped tube and transmitted along said bundle of fiber optic strands, and further causing said second portion of said heat shrink tube to contract onto, and be in optical communication with, said generally cylindrically-shaped envelope of said light bulb and form a cylindrically-shaped portion having an inner diameter equal to said outer diameter of said generally cylindrically-shaped envelope of said light bulb as a result of heat shrink fit, so that said light bulb can be easily slid out of, and slide into, said cylindrically-shaped portion of said substantially conically-shaped tube when replacement thereof is necessary without damage to said substantially cylindrically-shaped envelope of said light bulb.

5. A method of illuminating at least one item in a dashboard from an easily accessible centralized light source, comprising the step of illuminating the at least one item in the dashboard with a fiber optic fixture which comprises:

a) a bundle of bier optic strands having a first end and a second end; said first end of each strand of said bundle of fiber optic strands being connected to, and in optical communication with, a respective item of said at least one item in said dashboard;

b) a substantially conically-shaped tube having a cylindrically-shaped portion with an inner diameter and an open wide end, and a tapered portion having a tapered shape and being integral with, and extending smoothly and coaxially from, said cylindrically-shaped portion of said substantially conically-shaped tube; said tapered portion of said substantially conically-shaped tube having an open narrow end being displaced from, and narrower than, said open wide end of said cylindrically-shaped portion of said substantially conically-shaped tube; said open narrow end of said tapered portion of said substantially conically-shaped tube receiving, and being in optical communication with, said second end of said bundle of fiber optics strands; and c) a single light bulb passing through said open wide end of said cylindrically-shaped portion of said substantially conically-shaped tube and entering coaxially into, and being in optical communication with, said cylindrically-shaped portion of said substantially conically-shaped tube, so that when said single light bulb is illuminated light therefrom passes through said cylindrically-shaped portion of said substantially conically-shaped tube into said tapered portion of said substantially conically-shaped tube where the light is concentrated without dispersion as a result of said tapered shape of said tapered portion of said substantially conically-shaped tube and directed to said bundle of fiber optic strands where the light is transmitted therealong to, and illuminating, said at least one item in said dashboard; said single light bulb having a substantially cylindrically-shaped envelope with an outer diameter equal to said inner diameter of said cylindrically-shaped portion of said substantially conically-shaped tube, so that said single light bulb can be easily slid out of, and slide into, said cylindrically-shaped portion of said substantially conically-shaped tube when replacement thereof is necessary; said single light bulb being positioned in an easily accessible portion of said dashboard, so that said single light bulb can be easily accessed without having to at least one of crawl under and disassemble said dashboard when replacement thereof is necessary; and wherein said substantially conically-shaped tube is a heat shrink tubing subsequently to being shrunk to conform to said first end of said bundle of fiber optic strands and said substantially cylindrical-shaped envelope of said light bulb.

* * * * *